(12) United States Patent
Kato et al.

(10) Patent No.: US 6,856,738 B2
(45) Date of Patent: Feb. 15, 2005

(54) OPTICAL FIBER AND OPTICAL TRANSMISSION SYSTEM

(75) Inventors: Takatoshi Kato, Yokohama (JP); Shigeru Tanaka, Yokohama (JP); Masashi Onishi, Yokohama (JP); Yuji Kubo, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 702 days.

(21) Appl. No.: 09/732,725

(22) Filed: Dec. 11, 2000

(65) Prior Publication Data

US 2001/0019653 A1 Sep. 6, 2001

(30) Foreign Application Priority Data

Dec. 13, 1999 (JP) .............................. 11-353262
Dec. 13, 1999 (JP) .............................. 11-353270
May 1, 2000 (JP) ...................... 2000-132652

(51) Int. Cl.$^7$ .................................... G02B 6/22
(52) U.S. Cl. ........................ 385/123; 385/127
(58) Field of Search ................. 385/123–128

(56) References Cited

U.S. PATENT DOCUMENTS

| | | | | |
|---|---|---|---|---|
| 4,715,679 A | * | 12/1987 | Bhagavatula | .............. 385/127 |
| 5,553,185 A | | 9/1996 | Antos et al. | |
| 5,684,909 A | | 11/1997 | Liu | |
| 6,131,415 A | * | 10/2000 | Chang et al. | .............. 65/391 |
| 6,490,397 B2 | * | 12/2002 | Kato et al. | .............. 385/123 |
| 6,567,596 B2 | * | 5/2003 | Kato et al. | .............. 385/123 |
| 6,636,677 B2 | * | 10/2003 | Hasegawa et al. | .......... 385/127 |
| 2002/0102082 A1 | * | 8/2002 | Sarchi et al. | ............... 385/123 |

FOREIGN PATENT DOCUMENTS

| | | | | |
|---|---|---|---|---|
| CN | 1212538 | | 3/1999 | |
| EP | 0 833 002 A1 | | 12/1998 | |
| EP | 1 037 074 A1 | | 9/2000 | |
| GB | 2116744 A | * | 9/1983 | ............ G02B/5/14 |
| JP | 11-84159 | | 3/1999 | |
| WO | WO 00/63733 | | 10/2000 | |

* cited by examiner

Primary Examiner—John D. Lee
Assistant Examiner—Sarah Song
(74) Attorney, Agent, or Firm—McDermott Will & Emery LLP

(57) ABSTRACT

An optical fiber and an optical transmission system are provided which enable a large-volume and long-haul transmission, using light signals having a plurality of wavelengths in a wide range of wavelength bands including 1.31 μm band, 1.45 μm band, 1.55 μm band and 1.58 μm band. The chromatic dispersion of the optical fiber according to the present invention is −20 ps·nm$^{-1}$·km$^{-3}$ or more but −3 ps·nm$^{-1}$·km$^{-1}$ or less in the whole wavelength range of 1300 nm to 1600 nm. The optical transmission system according to the present invention is also equipped with (1) a plurality of transmitters to transmit light signals having wavelengths in the range of 1300 nm to 1600 nm, (2) an optical fiber of the present invention, and (3) receivers which receive the light signals.

15 Claims, 5 Drawing Sheets

OPTICAL FIBER AND OPTICAL TRANSMISSION SYSTEM

BACKGROUND OF THE INVENTION

1. Field of the Invention

The present invention relates to a Wavelength Division Multiplexing (WDM) transmission system to perform optical transmission by multiplexing light signals having a plurality of wavelengths, and an optical fiber used as the optical transmission line for the WDM optical transmission system.

2. Related Background Arts

The WDM transmission system using an optical fiber network can transmit a large volume of information. The WDM transmission system comprises a transmitter to send out light signals having a plurality of wavelengths, an optical fiber to transmit these light signals, a receiver to receive these light signals, and an optical fiber amplifier to amplify these light signals. In order to increase the transmission capacity of the WDM transmission system, an attempt has been made to expand the wavelength band used for the transmission.

European Patent Application Publication No. EP 1037074 discloses an optical fiber that has appropriate chromatic dispersions in the whole range of wavelengths including 1.53 μm to 1.61 μm, in which the optical fiber amplifier can obtain a positive gain. The optical fiber can hence restrain the waveform degradation of the light signal due to a nonlinear optical phenomenon as well as the waveform degradation of the light signal due to the accumulation of the chromatic dispersions. The zero dispersion wavelength of this optical fiber is at least 1.61 μm but not more than 1.67 μm, and the chromatic dispersion slope at wavelength of 1.55 μm is 0.15 ps•nm$^{-2}$•km$^{-1}$ or less. In the implementation examples of the cited invention, optical fibers having a chromatic dispersion slope of at least 0.07 ps•nm$^{-2}$•km$^{-1}$ but not more than 0.15 ps•nm$^{-2}$•km$^{-1}$ are disclosed.

As for the optical fibers disclosed in the above-mentioned bulletin no consideration is made about the use in 1.31 μm band and 1.45 μm band (S band).

SUMMARY OF THE INVENTION

An object of the present invention is to provide an optical fiber which can achieve a large-volume and long-haul transmission, using light signals having a plurality of wavelengths in the wide range of wavelengths including 1.31 μm band, 1.45 μm band, 1.55 μm band and 1.58 μm band, as well as a transmission system including such an optical fiber.

In order to achieve this and other objects, an optical fiber is provided in which the chromatic dispersion is −20 ps•nm$^{-1}$•km$^{-1}$ or more but −3 ps•nm$^{-1}$•km$^{-1}$ or less in the whole wavelength range of 1300 nm to 1600 nm.

Furthermore, an optical transmission system is provided which comprises (1) a plurality of transmitters to send out light signals having wavelengths in the range of 1300 nm to 1600 nm, (2) an optical fiber to transmit the light signals and the chromatic dispersions thereof are −20 ps•nm$^{-1}$•km$^{-1}$ or more but −3 ps•nm$^{-1}$•km$^{-1}$ or less at wavelengths in the range of 1300 nm to 1600 nm, and (3) receivers to receive the light signals.

An optical fiber according to an embodiment of the present invention is provided with (1) a central core region including the center of optical axis and having a first refractive index, (2) a second core region enclosing the central core region and having a second refractive index which is smaller than the first refractive index, (3) a third core region enclosing the second core region and having a third refractive index which is greater than the second refractive index, and (4) a clad region enclosing the third core region and having a fourth refractive index which is smaller than the third refractive index.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWING

For convenience to understand the drawings used in the detailed description of the present invention, a brief description of each drawing is provided.

DESCRIPTION OF THE PREFERRED EMBODIMENTS

Figure 1:
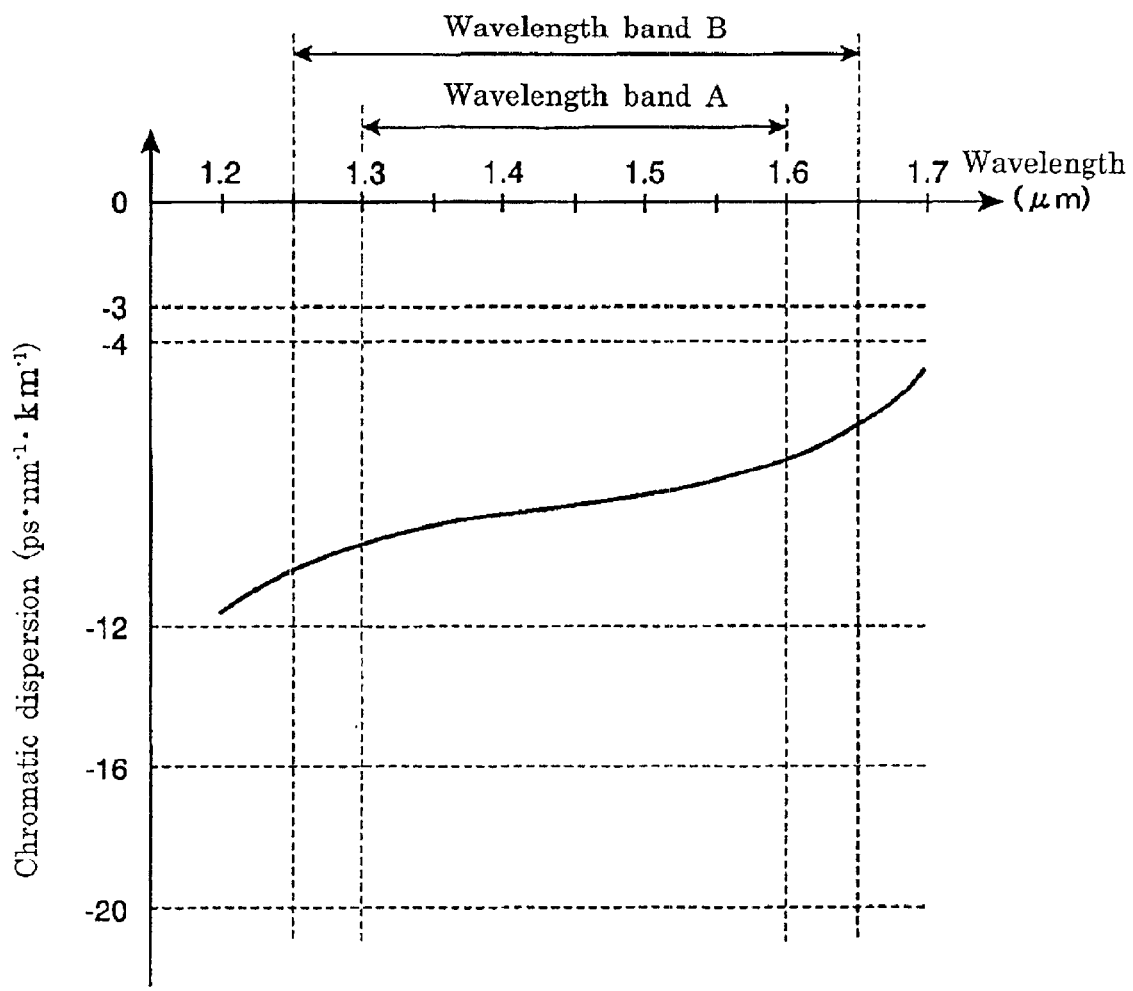
FIG. 1 shows the chromatic dispersion characteristic of an optical fiber according to an embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawing are partly exaggerated and do not always correspond to actual ratios of dimensions. FIG. 1 shows the chromatic dispersion characteristic of an optical fiber according to an embodiment of the present invention. The chromatic dispersion of the optical fiber is −20 ps•nm$^{-1}$•km$^{-1}$ or more but −3 ps•nm$^{-1}$•km$^{-1}$ or less in the whole wavelength range of 1300 nm to 1600 nm (wavelength band A). This wavelength band A includes the 1.31 μm band, 1.45 μm band, 1.55 μm band, and 1.58 μm band.

A chromatic dispersion of −20 ps•nm$^{-1}$•km$^{-1}$ or more enables the suppression of the waveform degradation of the light signal caused by the accumulation of the chromatic dispersions to a level not exceeding the level in the case of using a single mode fiber stipulated in G.654 of ITU at a wavelength of 1550 nm. A chromatic dispersion of −3 ps•nm$^{-1}$•km$^{-1}$ or less can restrain the waveform degradation of the light signal due to nonlinear optical phenomena. Therefore, using this optical fiber as an optical transmission line can achieve large-volume and long-haul transmission with the light signal at a plurality of wavelengths within the wavelength band A.

Preferably, the chromatic dispersion of an optical fiber according to the present invention is $-12$ ps•nm$^{-1}$•km$^{-1}$ or more but $-4$ ps•nm$^{-1}$•km$^{-1}$ or less at all wavelengths in the wavelength band A. A chromatic dispersion of $-12$ ps•nm$^{-1}$•km$^{-1}$ or more can more effectively suppress the waveform degradation of the light signal caused by the accumulation of the chromatic dispersions; a chromatic dispersion of $-4$ ps•nm$^{-1}$•km$^{-1}$ or less more effectively restrains the waveform degradation of the light signal caused by the nonlinear optical phenomena. Accordingly, larger-volume and longer-distance transmission is possible in this case, using the light signals having numerous wavelengths in the wavelength band A.

More preferably, the chromatic dispersion of an optical fiber according to the present invention is $-20$ ps•nm$^{-1}$•km$^{-1}$ or more but $-3$ ps•nm$^{-1}$•km$^{-1}$ or less in the whole range of wavelength band of 1250 nm to 1650 nm (wavelength band B), which is wider than the above-mentioned wavelength band A. In this case, a further larger volume and long distance transmission is possible using the light signals having numerous wavelengths in the wavelength band B which is wider than the wavelength band A.

Yet more preferably, the chromatic dispersion of an optical fiber according to the present invention is $-16$ ps•nm$^{-1}$•km$^{-1}$ or more but $-4$ ps•nm$^{-1}$•km$^{-1}$ or less at all of the wavelengths in wavelength band B. A chromatic dispersion of $-16$ ps•nm$^{-1}$•km$^{-1}$ or more enables to more effectively suppress the waveform degradation of the light signal caused by the accumulation of the chromatic dispersions; a chromatic dispersion of $-4$ ps•nm$^{-1}$•km$^{-1}$ or less more effectively restrains the waveform degradation of the light signal caused by the nonlinear optical phenomena. Accordingly, it is possible to make a larger-volume and longer-distance transmission, using the light signal of numerous wavelengths in wavelength band B.

Also, it is ideal that the effective area of the optical fiber according to the present invention is 40 µm$^2$ or more at a wavelength of 1550 nm. In this case, the waveform degradation of the light signal caused by nonlinear optical phenomena becomes below the level of signal deterioration due to nonlinearities in the case of the dispersion-shifted optical fiber that is stipulated in G.653 of ITU, and hence it is suitable for performing a long-haul transmission.

Also, the increase in loss due to the OH group of the optical fiber according to the present invention is preferably $-0.1$ dB•km$^{-1}$ or less at a wavelength of 1380 nm. In this case, because a wavelength near the 1380 nm wavelength can also be used as the light signal wavelength, it is possible to make a larger-volume transmission.

A refractive index profile that is suitable for realizing the optical fiber according to the present invention is explained in the following. The refractive index profile shown in FIG. 2 has, in the order of enumeration from the center of the optical axis, a central core region (refractive index $n_1$, outer diameter $2a$), a second core region (refractive index $n_2$, outer diameter $2b$), a third core region (refractive index $n_3$, outer diameter $2c$), and a clad region (refractive index $n_4$). The size relations of the respective refractive indexes are $n_1 > n_2$, $n_2 < n_3$, and $n_3 > n_4$. More preferably, the relative refractive index difference $\Delta_1$ of the central core region is from 0.4% to 0.7% based on the refractive index of the outermost layer of the clad region. An optical fiber having such a refractive index profile can be obtained by adding on the silica glass basis, for example, GeO$_2$ to both the central core region and the third core region, and/or F element to both the second core region and the clad region.

Figure 2:
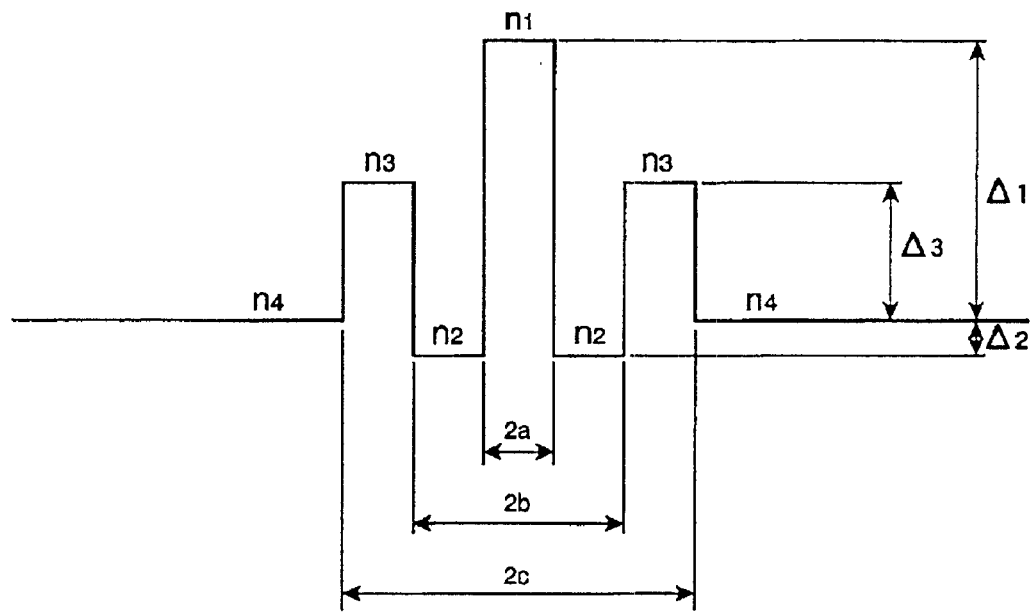
FIG. 2 shows a preferable example of the refractive index profile of an optical fiber according to an embodiment of the present invention.
Figure 3:
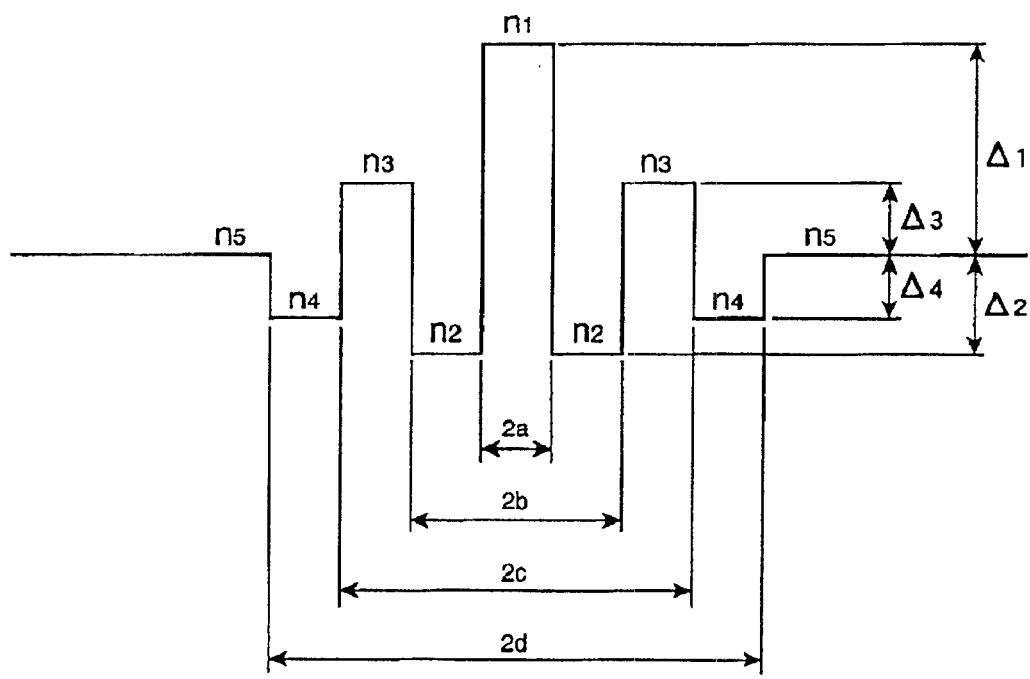
FIG. 3 shows another preferable example of the refractive index profile of an optical fiber according to an embodiment of the present invention.

The refractive index profile shown in FIG. 3 is such that the clad region in the refractive index profile of FIG. 2 is replaced by an inner clad region (refractive index $n_4$, outer diameter $2d$) and an outer clad region (refractive index $n_5$), wherein $n_4 < n_5$. Preferably, the relative refractive index difference $\Delta_1$ of the central core region is from 0.4% to 0.7% based on the refractive index of the outermost layer of the outer clad region. An optical fiber having such a refractive index profile can be obtained by adding on the silica glass basis, for example, GeO$_2$ to both the central core region and the third core region, and/or F element to both the second core region and the inner clad region.

Figure 4:
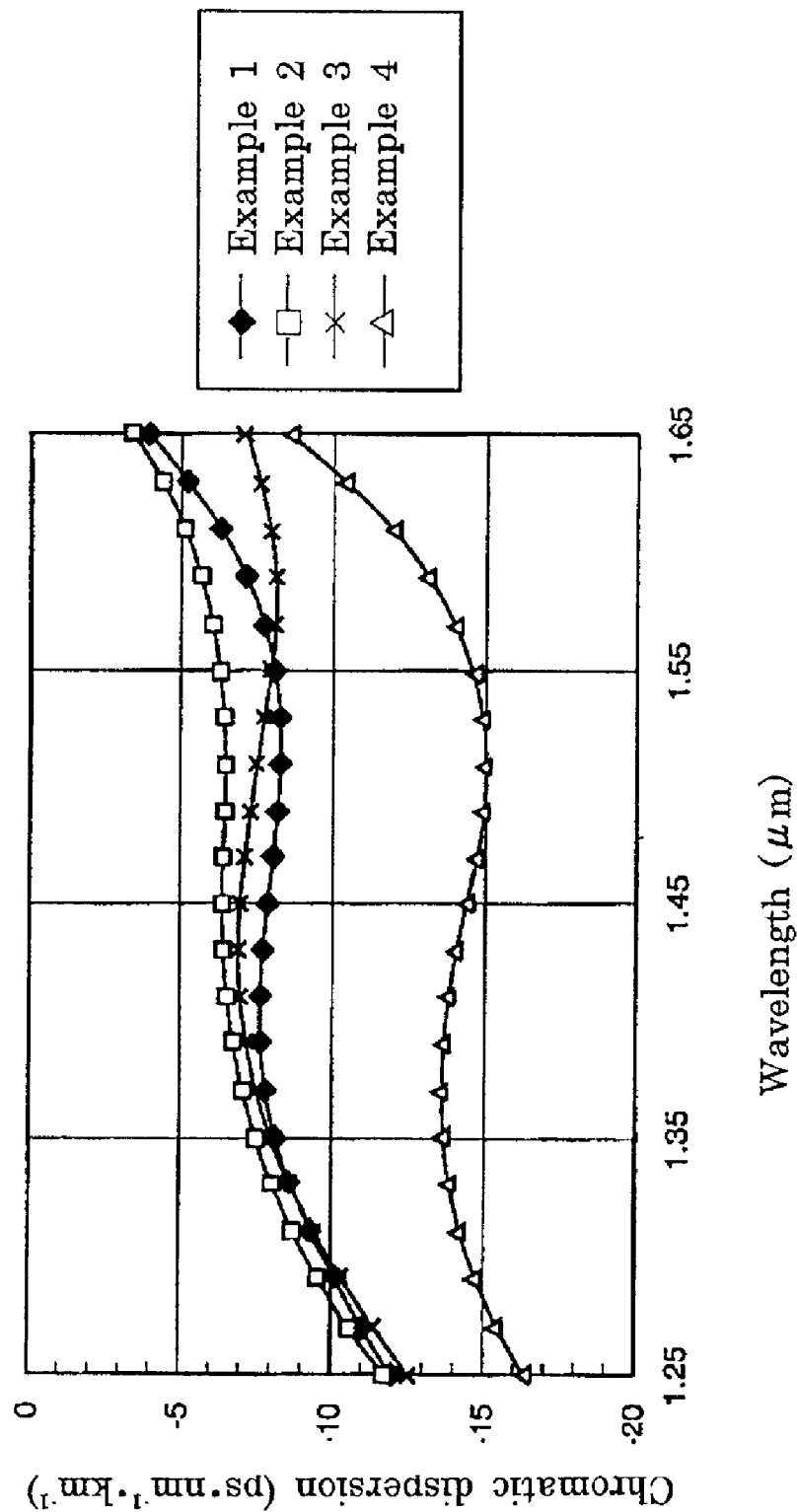
FIG. 4 is a graph showing the chromatic dispersion characteristic of each of the optical fibers described in the implementation examples.

Next, four implementation examples regarding the optical fiber according to the present invention are explained in reference to Table 1. The optical fibers of the implementation examples have the refractive index profiles shown in FIG. 3. FIG. 4 is a graph showing the chromatic dispersion characteristics of each of the optical fibers in the implementation examples.

TABLE 1

| | EXAMPLES | | | |
|---|---|---|---|---|
| Example # | 1 | 2 | 3 | 4 |
| 2a (µm) | 5.7 | 5.5 | 5.2 | 5.0 |
| 2b (µm) | 14.7 | 14.5 | 15.1 | 14.3 |
| 2c (µm) | 22.5 | 21.3 | 21.6 | 21.6 |
| 2d (µm) | 45.2 | 42.6 | 43.2 | 43.2 |
| $\Delta n_1$ (%) | 0.50 | 0.55 | 0.57 | 0.59 |
| $\Delta n_2$ (%) | −0.20 | −0.20 | −0.20 | −0.15 |
| $\Delta n_3$ (%) | 0.25 | 0.30 | 0.29 | 0.27 |
| $\Delta n_4$ (%) | −0.20 | −0.20 | −0.20 | −0.15 |
| Chromatic dispersion (ps · nm$^{-1}$ · km$^{-1}$) | | | | |
| at 1250 nm | −11.98 | −11.82 | −12.60 | −16.40 |
| at 1310 nm | −9.22 | −8.81 | −9.42 | −14.30 |
| at 1550 nm | −8.07 | −6.28 | −7.99 | −14.70 |
| at 1650 nm | −3.81 | −3.32 | −7.10 | −8.60 |
| Dispersion slope (ps · nm$^{-2}$ · km$^{-1}$)[1] | 0.016 | 0.011 | −0.008 | 0.027 |
| Effective area (µm$^2$)[1] | 52.1 | 46.6 | 42.1 | 49.3 |
| Mode field diameter (µm)[1] | 7.95 | 7.44 | 7.15 | 7.75 |
| Bend loss (dB)[2] | 2.4 | 0.2 | 1.5 | 0.8 |
| $\lambda_0$ (nm) | 1694 | 1700 | 1757 | 1724 |
| $\lambda_c$ (nm) | 1290 | 1310 | 1220 | 1330 |
| $\Delta \alpha_{1.38}$ (dB · km$^{-1}$) | 0.01 | 0.06 | 0.03 | 0.03 |

[1] at 1550 nm
[2] at 1550 nm, 1 turn 32 mm

The chromatic dispersion of each optical fiber in the first through fourth implementation examples is $-20$ ps•nm$^{-1}$•km$^{-1}$ or more but $-3$ ps•nm$^{-1}$•km$^{-1}$ or less at all wavelengths in the wavelength band A as well as the wavelength band B. Also, each optical fiber in the first through fourth implementation examples has an effective area of 40 µm or more at a wavelength of 1550 nm and loss increase of 0.1 dB•km$^{-1}$ or less due to OH group at a wavelength of 1380 nm. The chromatic dispersion of each optical fiber in the first through third implementation examples is $-12$ ps•nm$^{-1}$•km$^{-1}$ or more but $-4$ ps•nm$^{-1}$•km$^{-1}$ or less in all wavelengths in the wavelength band A. Also, the chromatic dispersion of the optical fiber in the third implementation example is $-16$ ps•nm$^{-1}$•km$^{-1}$ or more but $-4$ ps•nm$^{-1}$•km$^{-1}$ or less at all wavelengths in the wavelength band B.

Figure 5:
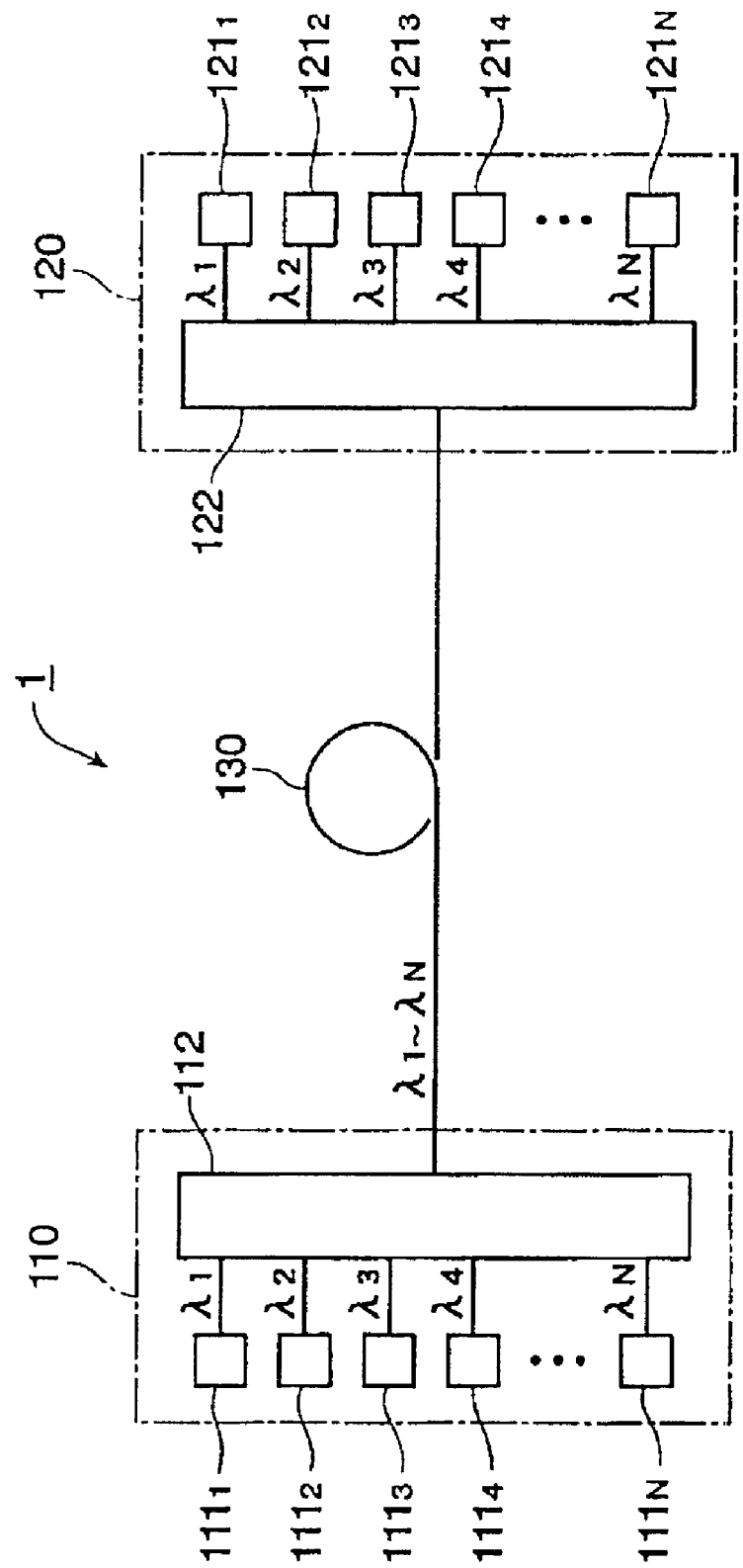
FIG. 5 is a schematic diagram of an optical transmission system according to a first embodiment of the present invention.

Next, a first embodiment of an optical transmission system employing the optical fiber according to the present invention as an optical transmission line is explained with reference to FIG. 5. An optical transmission system 1 is provided with an optical fiber 130 as the optical transmission line between a transmitting station 110 and a receiving station 120.

The transmitting station 110 includes N units of transmitters $111_1$–$111_N$ (N≧2) and an optical multiplexer 112. The transmitter $111_n$ (n is an integer of 1 or greater but not greater than N) outputs a light signal having a wavelength of $\lambda_n$ within the wavelength band A or wavelength band B. Of the wavelengths $\lambda_1$ to $\lambda_N$, some are in 1.31 $\mu$m band, some other wavelengths are in 1.45 $\mu$m band, some other wavelengths are in 1.55 $\mu$m band and the other wavelengths are in 1.58 $\mu$m band. The optical multiplexer 112 multiplexes the light signals of wavelengths $\lambda_1$–$\lambda_N$ and sends out the same to the optical fiber 130. The optical fiber 130 transmits the multiplexed light signals having wavelengths $\lambda_1$–$\lambda_N$, which have been sent out by the optical multiplexer 112, to the receiving station 120. The optical fiber 130 exhibits the chromatic dispersions in the range of –20 ps•nm$^{-1}$•km$^{-1}$ or more but –3 ps•nm$^{-1}$•km$^{-1}$ or less at all wavelengths in the wavelength band A. Also, the chromatic dispersion of the optical fiber 130 is preferably –12 ps•nm$^{-1}$•km$^{-1}$ or more but equal to or less than –4 ps•nm$^{-1}$•km$^{-1}$ at all wavelengths of the wavelength band A, or –20 ps•nm$^{-1}$•km or more but equal to or less than –3 ps•nm$^{-1}$•km$^{-1}$ at all wavelengths of the wavelength band B. More preferably, the chromatic dispersion is –16 ps•nm$^{-1}$•km$^{-1}$ or more but –4 ps•nm$^{-1}$•km$^{-1}$ or less at all wavelengths in the wavelength band B. Also, more preferably, the effective area of the optical fiber 130 is 40 $\mu$m$^2$ or more at a wavelength of 1550 nm, and the loss increase due to OH group at a wavelength of 1380 nm is 0.1 dB•km$^{-1}$ or less.

The receiving station 120 includes N units of receivers $121_1$14 $121_N$ and a demultiplexer 122. The demultiplexer 122 demultiplexes the multiplexed light signals having the wavelengths of $\lambda_1$–$\lambda_N$, which have been received through the optical fiber 130, and outputs the same. A receiver $121_n$ receives light signal having a wavelength of $\lambda_n$ which has been output from the demultiplexer 122.

As for this optical transmission system 1, since the optical fiber 130 according to the present invention as mentioned above is used as the optical transmission line between the transmitting station 110 and the receiving station 120, the waveform degradation of the light signal due to nonlinear optical phenomena as well as the waveform degradation of the light signal due to the accumulation of the chromatic dispersions are restrained at all wavelengths of the wavelength band A or the wavelength band B, including the 1.31 $\mu$m band, 1.45 $\mu$m band, 1.55 $\mu$m band, and 1.58 $\mu$m band. Therefore, the optical transmission system 1 enables a large-volume long-haul transmission using light signals having the numerous wavelengths of $\lambda_1$–$\lambda_N$ in the wavelength band A or the wavelength band B.

Next, a second embodiment of an optical transmission system employing the optical fiber according to the present invention as an optical transmission line is explained with reference to FIG. 6. An optical transmission system 2 is provided with an optical fiber 231 as the optical transmission line between a transmitting station 210 and a relay station 240 and further provided with an optical fiber 232 as an optical transmission line between the relay station 240 and a receiving station 220.

The transmitting station 210 includes N units of transmitters $211_1$–$211_N$, optical multiplexers $212_1$, $212_2$, optical amplifiers $213_1$, $213_2$, and an optical multiplexer 214. The transmitter $211_n$ outputs a light signal having wavelength $\lambda_n$ in the wavelength band A or wavelength band B. Of the wavelengths $\lambda_1$–$\lambda_N$, some are in 1.31 $\mu$m band, some other wavelengths are in 1.45 $\mu$m band, some other wavelengths are in 1.55 $\mu$m band, and the other wavelengths are in 1.58 $\mu$m band. The optical multiplexer $212_1$ multiplexes light signals having wavelengths $\lambda_1$–$\lambda_M$ in a first wavelength band which have been sent out from transmitters $211_1$–$211_M$ (M is an integer of 1 or greater but not greater than N). The optical amplifier $213_1$ amplifies the multiplexed light signals having wavelengths $\lambda_1$–$\lambda_M$ altogether, and outputs the same. The optical multiplexer $212_2$ multiplexes light signals having wavelengths $\lambda_{M+1}$–$\lambda_N$ in a second wavelength band which have been sent out from the transmitters $211_{M+1}$–$211_N$, and the optical amplifier $213_2$ amplifies the multiplexed light signals having wavelengths $\lambda_{M+1}$–$\lambda_N$ altogether. The optical multiplexer 214 multiplexes the amplified light signals having wavelengths $\lambda_1$–$\lambda_M$ and the amplified light signals having wavelengths $\lambda_{M+1}$–$\lambda_N$, and sends out the same to the optical fiber 231.

The optical fiber 231 transmits the light signals having wavelengths $\lambda_1$–$\lambda_N$, which have been sent out from the transmitting station 210, to the relay station 240. This optical fiber 231 exhibits the chromatic dispersions of –20 ps•nm$^{-1}$•km$^{-1}$ or more but –3 ps•nm$^{-1}$•km$^{-1}$ or less at all wavelengths of the wavelength band A. Preferably, the chromatic dispersion of the optical fiber 231 is –12 ps•nm$^{-1}$•km$^{-1}$ or more but –4 ps•nm$^{-1}$•km$^{-1}$ or less at all wavelengths of the wavelength band A, or the chromatic dispersion is –20 ps•nm$^{-1}$•km$^{-1}$ or more but –3 ps•nm$^{-1}$•km$^{-1}$ or less at all wavelengths of the wavelength band B. More preferably, the chromatic dispersion is equal to or more than –16 ps•nm$^{-1}$•km$^{-1}$ but –4 ps•nm$^{-1}$•km$^{-1}$ or less at all wavelengths in the wavelength band B. Also, the effective area of the optical fiber 231 at the wavelength of 1550 nm is equal to or more than 40 $\mu$m, and the loss increase by OH group at a wavelength of 1380 nm is –0.1 dB•km or less.

The relay station 240 includes a demultiplexer 241, optical amplifiers $242_1$, $242_2$, and an optical multiplexer 243. The demultiplexer 241 demultiplexes the light signals of wavelengths $\lambda_1$–$\lambda_N$ that have reached thereto into a first wavelength band including wavelengths $\lambda_1$–$\lambda_M$ and a second wavelength band including wavelengths $\lambda_{M+1}$–$\lambda_N$. The optical amplifier $242_1$ amplifies the light signals having the wavelengths $\lambda_1$–$\lambda_M$ in the first wavelength band altogether, and the optical amplifier $242_2$ amplifies the light signals having the wavelengths $\lambda_{M+1}$–$\lambda_N$ in the second wavelength band altogether. Then, the optical multiplexer 243 multiplexes the light signals having the wavelengths $\lambda_1$–$\lambda_M$ and the light signals having wavelength $\lambda_{M+1}$–$\lambda_N$ which have been amplified and output, and sends out the same to an optical fiber 232.

The optical fiber 232 transmits the light signals having wavelength $\lambda_1$–$\lambda_N$, which have been sent out from the relay station 240, to the receiving station 220. The optical fiber 232 has the same characteristic as the optical fiber 231.

The receiving station 220 includes N units of receivers $221_1$–$221_N$, demultiplexers $222_1$, $222_2$, optical amplifiers $223_1$, $223_2$, and a demultiplexer 224. The demultiplexer 224 demultiplexes the light signals having wavelengths $\lambda_1$–$\lambda_N$, which have been received through the optical fiber 232, into a first wavelength band including wavelengths $\lambda_1$–$\lambda_M$ and a second wavelength band including wavelengths $\lambda_{M+1}$–$\lambda_N$. The optical amplifier $223_1$ amplifies the light signals of wavelengths $\lambda_1$–$\lambda_M$ altogether, and the demultiplexer $222_1$ demultiplexes these light signals of wavelengths $\lambda_1$–$\lambda_M$ into each wavelength. The optical amplifier $223_2$ amplifies the light signals of wavelengths $\lambda_{M+1}$–$\lambda_N$ altogether, and the demultiplexer $222_2$ demultiplexes these light signals into each wavelength. The receiver $221_n$ receives the light signal having the wavelength $\lambda_n$ which has been output from the demultiplexer $222_1$ or $222_2$.

As for the optical transmission system 2, since the optical fibers 231, 232 according to the present invention are used, as mentioned above, as the optical transmission lines between the transmitting station 210 and the relay station 240 and between relay station 240 and the receiving station 220, respectively, the waveform degradation of the light signal due to nonlinear optical phenomena as well as the waveform degradation of the light signal due to the accumulation of the chromatic dispersions are restrained at all wavelengths of the wavelength band A or the wavelength band B, including the 1.31 μm band, 1.45 μm band, 1.55 μm band, and 1.58 μm band. Therefore, the optical transmission system 2 enables a large-volume long-haul transmission using light signals having the numerous wavelengths of $\lambda_1$–$\lambda_N$ in the wavelength band A or the wavelength band B.

Also, in this optical transmission system 2, the optical amplifiers 213₁, 242₁, and 223₁ amplify the light signals having wavelength $\lambda_1$–$\lambda_M$ in the first wavelength band altogether, and the optical amplifiers 213₂, 242₂, and 223₂ amplify the light signals having wavelengths $\lambda_{M+1}$–$\lambda_N$ in the second wavelength band altogether, and accordingly this enables a long-haul transmission. By way of example, the first wavelength band includes the 1.55 and 1.58 μm band, and an erbium-doped fiber amplifier (EDFA) can be used as the optical amplifier which amplifies the light signals in the first wavelength band altogether. On the other hand, the second wavelength band includes the 1.31 μm band and 1.45 μm band, and a semiconductor optical amplifier or a Raman amplifier can be used as the optical amplifier which amplifies the light signals in the second wavelength band altogether.

Figure 6:
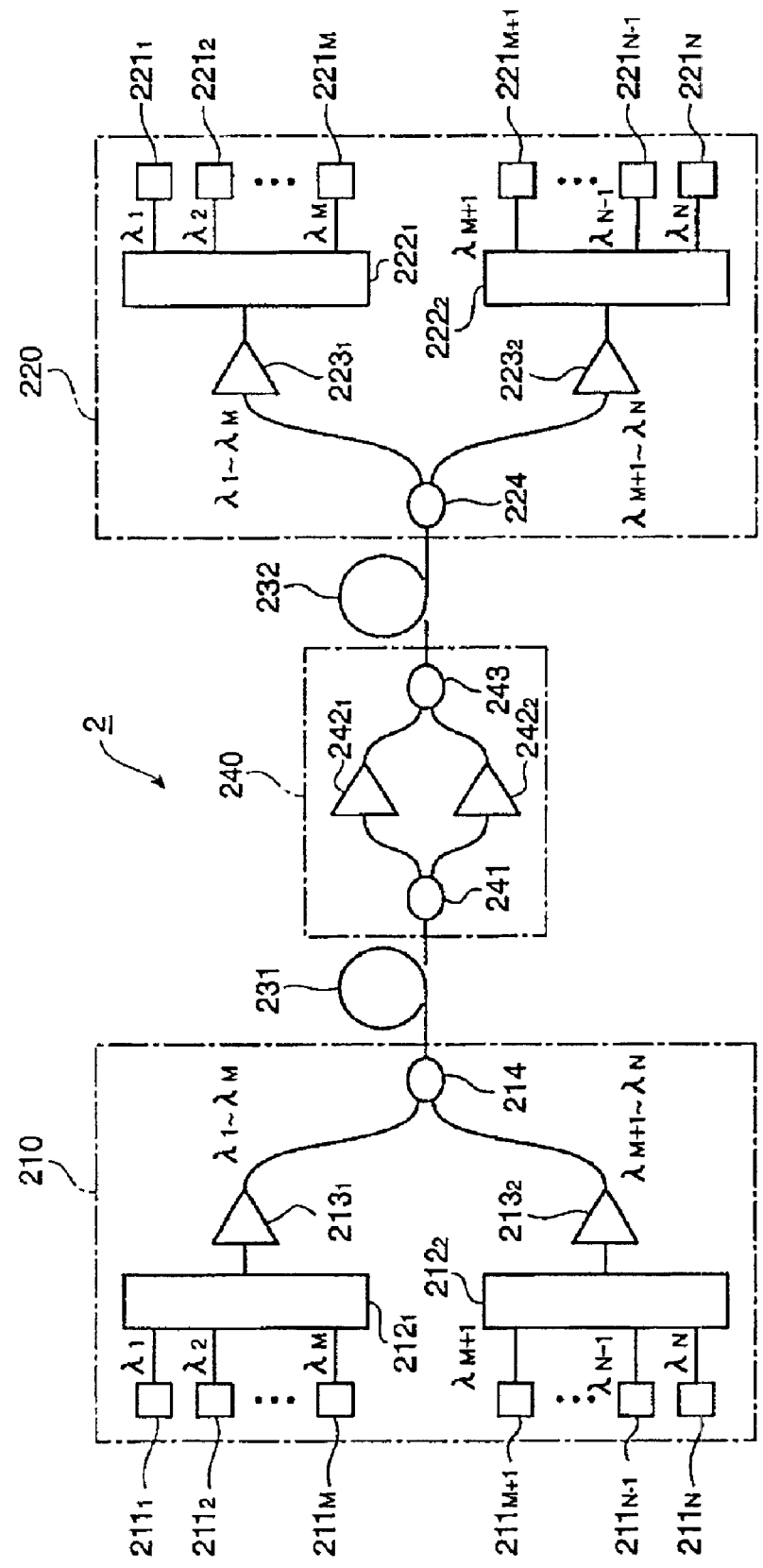
FIG. 6 is a schematic diagram of an optical transmission system according to a second embodiment of the present invention.

In the composition shown in FIG. 6, the light signals are divided into two wavelength bands and each of them is amplified by the respective optical amplifier. However, all of them may be amplified by one optical amplifier, or they may be divided into three or more wavelength bands and each of them may be amplified by a respective optical amplifier. For example, the light signals may be divided into four wavelength bands: the 1.31 μm band, 1.45 μm band, 1.55 μm band, and 1.58 μm band. Then, a praseodymium-doped fiber amplifier (PDFA) can be used for the amplification of the light signal at the 1.31 μm band. A thulium-doped fiber amplifier (TDFA) can be used for the amplification of the light signal at the 1.45 μm band. An EDFA can be used for the amplification of the light signals at the 1.55 μm band and the 1.58 μm band, respectively. For the amplification of any light signal in any of the wavelength bands, a semiconductor optical amplifier or a Raman amplifier can be used.

What is claimed is:

1. An optical fiber whose chromatic dispersion is −20 ps•nm$^{-1}$•km$^{-1}$ or more but −3 ps•nm$^{-1}$•km$^{-1}$ or less at all of the wavelengths in a range of 1300 nm to 1600 nm, wherein a dispersion slope of said optical fiber is positive at, at least, one wavelength in the range of 1300 nm to 1600 nm, and wherein the cutoff wavelength is not more than 1330 nm.

2. An optical fiber according to claim 1, wherein said chromatic dispersion is −12 ps•nm$^{-1}$•km$^{-1}$ or more but −4 ps•nm$^{-1}$•km$^{-1}$ or less.

3. An optical fiber according to claim 1, wherein said chromatic dispersion is −20 ps•nm$^{-1}$•km$^{-1}$ or more but −3 ps•nm$^{-1}$•km$^{-1}$ or less at all of the wavelengths in the range of 1250 nm to 1650 nm.

4. An optical fiber according to claim 3, wherein said chromatic dispersion is −16 ps•nm$^{-1}$•km$^{-1}$ or more but −4 ps•nm$^{-1}$•km$^{-1}$ or less.

5. An optical fiber whose chromatic dispersion is −20 ps•nm$^{-1}$•km$^{-1}$ or more but −3 ps•nm$^{-1}$•km$^{-1}$ or less at all of the wavelengths in the range of 1300 nm to 1600 nm, wherein the bending loss is not more than 2.4 dB at the wavelength of 1550 nm when said fiber is wound 1 turn about 32 mm diameter mandrel.

6. An optical fiber whose chromatic dispersion is −20 ps•nm$^{-1}$•km$^{-1}$ or more but −7.1 ps•nm$^{-1}$•km$^{-1}$ or less at all of the wavelengths in the range of 1300 nm to 1600 nm, wherein a dispersion slope of said optical fiber is positive at, at least, one wavelength in the range of 1300 nm to 1600 nm.

7. An optical fiber according to any of claims 1, 5, and 6, wherein the effective area at wavelength of 1550 nm is 40 μm$^2$ or more.

8. An optical fiber according to any of claims 1, 5, and 6, wherein the loss increase due to OH group at a wavelength of 1380 nm is 0.1 dB•km$^{-1}$ or less.

9. An optical fiber according to any of claims 1, 5, and 6, wherein said optical fiber is provided with (1) a central core region including the center of the optical axis and having a first refractive index, (2) a second core region enclosing the central core region and having a second refractive index which is smaller than the first refractive index, (3) a third core region enclosing the second core region and having a third refractive index which is greater than the second refractive index, and (4) a clad region enclosing the third core region and having a fourth refractive index which is smaller than the third refractive index.

10. An optical fiber according to claim 9, wherein said clad region includes an inner clad region having a refractive index smaller than said third refractive index and an outer clad region having a refractive index greater than the refractive index of the inner clad region.

11. An optical fiber according to claim 9, wherein the relative refractive index difference of said central core region is 0.4% or more but 0.7% or less with respect to the refractive index of the outermost layer of said clad region.

12. An optical transmission system comprising:

a transmitting station to send out light signals having wavelengths in the range of 1300 nm to 1600 nm after multiplexing the same;

an optical fiber according to claim 1 to transmit said light signals; and a receiving station to receive said light signals and demultiplex the same into their respective wavelengths.

13. An optical transmission system according to claim 12, wherein said a transmitting station sends out light signals having wavelengths in the range of 1250 nm to 1650 nm after further multiplexing other light signals having wavelengths in the range of 1250 nm to 1300 nm and 1600 nm to 1650 nm, and said optical fiber has a chromatic dispersion of −20 ps•nm$^{-1}$•km$^{-1}$ or more but −3 ps•nm$^{-1}$•km$^{-1}$ or less at all of the wavelengths in the range of 1250 nm to 1650 nm.

14. An optical fiber whose chromatic dispersion is −20 ps•nm$^{-1}$•km$^{-1}$ or more but −3 ps•nm$^{-1}$•km$^{-1}$ or less at all of the wavelengths in the range of 1300 nm to 1600 nm, wherein the effective area at a wavelength of 1550 nm is 40 μm$^2$ or more.

15. An optical fiber whose chromatic dispersion is −20 ps•nm$^{-1}$•km$^{-1}$ or more but −3 ps•nm$^{-1}$•km$^{-1}$ or less at all of the wavelengths in the range of 1300 nm to 1600 nm, wherein the loss increase due to OH group at a wavelength of 1380 nm is 0.1 dB•km$^{-1}$ or less.

* * * * *